United States Patent Office 3,256,006
Patented June 14, 1966

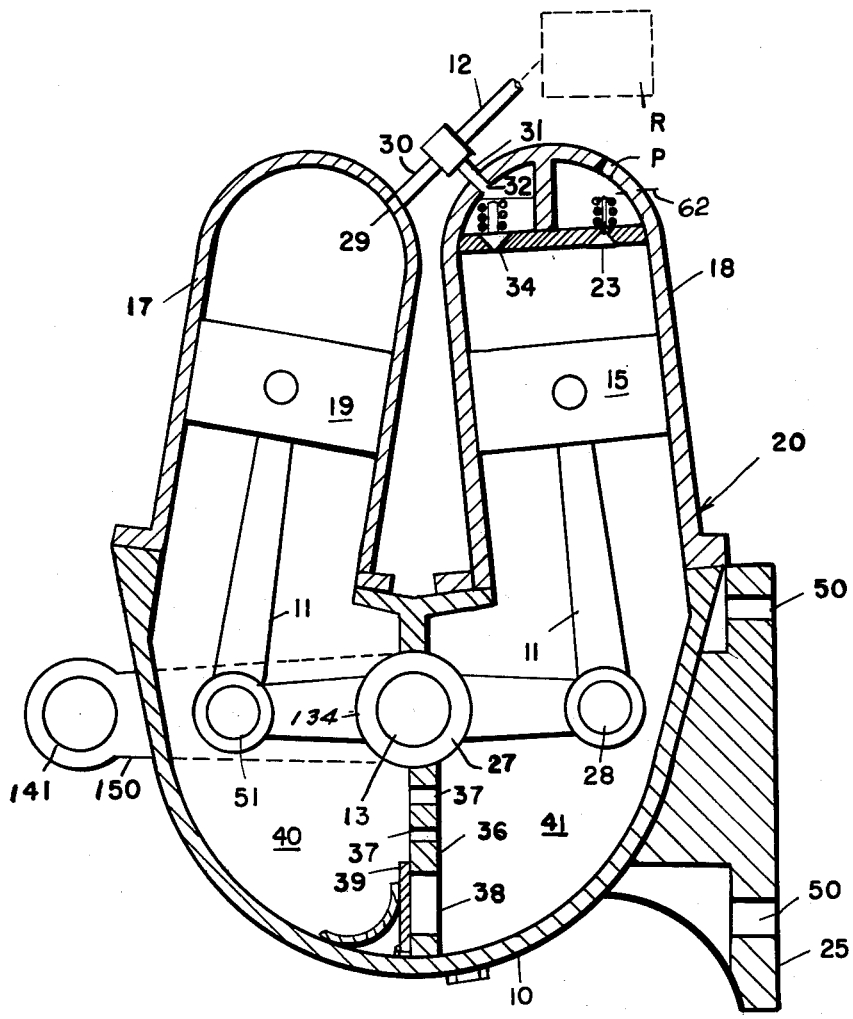

3,256,006
RESILIENT SUPPORT FOR VEHICLES
Anthony J. Bandur, Backus Road, R.D. 1,
Harborcreek, Pa.
Filed Mar. 16, 1964, Ser. No. 351,962
4 Claims. (Cl. 267—64)

This invention relates to shock absorbers and, more particularly, to the type of shock absorbers used in automotive passenger vehicles and the like.

In the device shown, a crankcase is filled with hydraulic oil to a predetermined point above the bottom of the two pistons. The case must be held upside down when it is being filled in order to remove all the air. The space above the air cylinders and the reservoir is filled with compressed air at the outset. Subsequent air is added by the second air compressor cylinder. As the car rides along a bumpy road the axles will move up and down over the bumps and the car will ride smoothly.

The first cylinder is connected to the main air tank by means of a valve controlled by the driver of the vehicle. This may be done by a control on the floor board of the vehicle or the like. As the first piston moves up, the piston of the second cylinder moves down. The fluid moves from the compressor through openings in valves located at the center lower wall to the left side or main cylinder side. As the pistons action reverses, the valve at the center bottom closes and the fluid is forced back through the smaller openings which are calibrated according to the vehicle weight and by this method it acts as a shock absorber.

The shock absorber is completely efficient since the work done in filling the air tank is provided by the movement of the wheels. The intake air is forced into the reservoir only when the vehicle weight is shifted or the wheels bounce along the road. It is not necessary to pump air into the compressor because the escape of air is prevented by the sealed arrangement of the device. Additional air, as needed, is applied only if the driver lets the air out of the system. To refill the crankcase with new oil, the device must be turned upside down to eliminate all air from the bottom of the case. The main shaft comes out on both sides of the sealed container and has an arm connected to it which can be connected to the wheels of the vehicle.

It is an object of the invention to provide an improved shock absorber.

Another object is to provide a double acting shock absorber which offers more resistance in one direction than in the other.

Another object is to provide a pneumatic support for a vehicle.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

The drawing is a cross sectional view of a device according to the invention.

Now with more particular reference to the drawing, the device is made up of a crankcase 10 which is in the form of a reservoir divided into two compartments 40 and 41 by partition 36. The crankcase has a mounting flange 25 with suitable holes 50 therein for mounting the device to the frame of a vehicle or the like. The crankcase supports main bearings 27 which carry the crankshaft 13. The crankshaft 13 has journals 28 and 51, one of which is at a first end and the other at the second end that support the connecting rods 11. The connecting rods 11 are connected at their upper ends to the pistons 15 and 19 by the conventional wrist pins shown. The pistons 15 and 19 slide in the cylinders 17 and 18. The cylinders 17 and 18 have integral heads shown which have openings at the top. The opening 29 in cylinder 17 is connected to the line 30. The line 30, in turn, is connected to a suitable reservoir R.

A T-connection 31 is connected to a valve port 32 in the head. The valve 32 connects through an exhaust valve 34 to the space above the piston 15. The intake valve 23 allows air to flow in through the port P and into the space above piston 15 but not out.

The space 40 which encloses the arm 134 of crankshaft 13 is separated from the space 41 by a partition 36. The partition 36 has the metering holes 37 and the large opening 38. The large opening 38 is closed by a check valve 39 which allows fluid to flow from the chamber 41 to chamber 40 but prevents it from flowing from chamber 40 to chamber 41. Crank 150 has bearings 141 which may be connected to the axle of the vehicle so that when the wheels bounce over the ground, they will cause the end of the crank to swing about bearing 27 up and down and thus cause the cylinders to reciprocate, thereby pumping the air into the reservoir on the down stroke of the wheels and forcing the piston against the force of air in the reservoir on the up stroke of the wheels. At the same time the oil will be forced from chamber 40 to 41 and return as the pistons oscillate, thereby damping the vibration of this vehicle. Since hole 38 offers little resistance, the air above piston 19 will support the auto as the body goes down or the wheel rises as it hits a bump. The wheel cannot go down rapidly however since the flow of oil through openings 37 on the next stroke is limited.

When the reservoir R has received sufficient pressure, the driver may actuate the device 62 to hold valve 23 closed, thus preventing any more air from being drawn into the system. The device 62 is merely a lever which may be moved to a position and locked to hold the valve 23 open.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. An air spring for a vehicle and means for connecting said spring to said vehicle comprising
    a crank case, a crankshaft,
    a first and a second cylinder substantially parallel to each other and attached to said crank case,
    a piston in each said cylinder dividing each said cylinder into two portions,
    valve means positioned in the end of said first cylinder remote from said crank case, allowing air to flow from the portion of said first cylinder remote from said crankshaft to the portion of said second cylinder remote from said crankshaft, but preventing air from flowing in the opposite direction through said valve means,
    a partition in said crank case dividing said crank case into two portions,
    check valve means on said partition for allowing flow from the portion of said crank case adjacent said first cylinder to the portion of said crank case adjacent said second cylinder, said crankshaft being mounted in said crank case adjacent said partition, means connecting said pistons to said crankshaft, fluid in said crank case, and a fluid in the portion of said cylinders remote from said crank case to function as a shock absorber.

2. The air spring recited in claim 1 wherein orifice means is provided in said partition connecting said two portions together.

3. The air spring recited in claim 1 wherein a reservoir is provided, and means connects said reservoir to said portion of said second cylinder remote from said crank case.

4. The air spring recited in claim 3 wherein check valve means is provided on said first cylinder connecting the portion thereof remote from said crank case to the ambient atmosphere.

References Cited by the Examiner

UNITED STATES PATENTS

| | | | |
|---|---|---|---|
| 1,482,280 | 1/1924 | Wheeler | 188—88 |
| 2,001,202 | 5/1935 | Kunze | 257—8 X |
| 2,206,800 | 7/1940 | Armstrong | 188—88 |
| 2,260,277 | 10/1941 | Mercier | 267—64 X |
| 3,112,923 | 12/1963 | Ley | 267—64 X |

FOREIGN PATENTS 716,425   10/1954   Great Britain.

MILTON BUCHLER, *Primary Examiner.*

ARTHUR L. LA POINT, *Examiner.*

G. E. A. HALVOSA, *Assistant Examiner.*